(12) United States Patent
Ishioka (10) Patent No.: US 11,392,129 B2
(45) Date of Patent: Jul. 19, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 349 days.

(21) Appl. No.: 16/471,643

(22) PCT Filed: Dec. 27, 2016

(86) PCT No.: PCT/JP2016/088911
§ 371 (c)(1),
(2) Date: Jun. 20, 2019

(87) PCT Pub. No.: WO2018/122966
PCT Pub. Date: Jul. 5, 2018

(65) Prior Publication Data
US 2019/0317506 A1 Oct. 17, 2019

(51) Int. Cl.
*G05D 1/02* (2020.01)
*B60W 10/04* (2006.01)
(Continued)

(52) U.S. Cl.
CPC .......... *G05D 1/0212* (2013.01); *B60W 10/04* (2013.01); *B60W 10/20* (2013.01); *B60W 50/10* (2013.01);
(Continued)

(58) Field of Classification Search
None
See application file for complete search history.

(56) References Cited

U.S. PATENT DOCUMENTS 8,700,251 B1 * 4/2014 Zhu ................... B60W 30/12
701/25
9,268,332 B2 * 2/2016 Montemerlo ...... G06Q 30/0207
(Continued)

FOREIGN PATENT DOCUMENTS

CN 104064050 9/2014
CN 105988467 10/2016
(Continued)

OTHER PUBLICATIONS

International Search Report and Written Opinion for International Application No. PCT/JP2016/088911 dated Apr. 4, 2017, 13 pgs.
(Continued)

*Primary Examiner* — Tamara L Weber
(74) *Attorney, Agent, or Firm* — Amin, Turocy & Watson, LLP (57) ABSTRACT

A vehicle control system includes: an inputter that accepts an occupant's operation of a host vehicle; an autonomous driving controller that executes an autonomous driving mode for controlling steering and acceleration/deceleration of the host vehicle in a case where a predetermined operation is accepted by the inputter; and a mode controller that prohibits the autonomous driving mode from being started by the autonomous driving controller in a case where the host vehicle has reached a predetermined section including at least one of a divergence point, a merging point, and a destination.

14 Claims, 9 Drawing Sheets

(51) Int. Cl.
  *B60W 10/20*  (2006.01)
  *B60W 50/10*  (2012.01)
  *B60W 50/14*  (2020.01)
  *G05D 1/00*  (2006.01)

(52) U.S. Cl.
  CPC ........... *B60W 50/14* (2013.01); *G05D 1/0088* (2013.01); *B60W 2554/801* (2020.02); *B60W 2554/804* (2020.02); *G05D 1/0231* (2013.01); *G05D 1/0257* (2013.01)

(56) References Cited

U.S. PATENT DOCUMENTS

| | | | |
|---|---|---|---|
| 2013/0110343 A1 | 5/2013 | Ichikawa | |
| 2014/0156133 A1* | 6/2014 | Cullinane | B60W 50/082 701/23 |
| 2017/0225567 A1* | 8/2017 | Tsuda | G08G 1/015 |

FOREIGN PATENT DOCUMENTS

| | | |
|---|---|---|
| JP | 2007-323178 | 12/2007 |
| JP | 2008-290680 | 12/2008 |
| JP | 4985103 | 7/2012 |
| JP | 2015-011458 | 1/2015 |
| JP | 2015-161518 | 9/2015 |
| JP | 2016-050901 | 4/2016 |
| WO | 2011-158347 | 12/2011 |

OTHER PUBLICATIONS

Chinese Office Action for Chinese Patent Application No. 201680091816.7 dated Sep. 28, 2021.

* cited by examiner

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

A technique in which autonomous driving of a vehicle is started by an occupant operating a predetermined switch provided within the vehicle is known (see, for example, Patent Document 1).

CITATION LIST

Patent Document

[Patent Document 1]
Japanese Unexamined Patent Application, First Publication No. 2008-290680

SUMMARY OF INVENTION

Technical Problem

However, in the related art, immediately after instructions from an occupant are received and autonomous driving is started, it may be difficult to determine the autonomous driving.

The present invention was contrived in view of such circumstances, and one object thereof is to provide a vehicle control system, a vehicle control method, and a vehicle control program which make it possible to determine the start of autonomous driving more appropriately.

Solution to Problem

According to an invention of a first aspect, a vehicle control system is provided, including: an inputter that accepts an occupant's operation of a host vehicle; an autonomous driving controller that executes an autonomous driving mode for controlling steering and acceleration/deceleration of the host vehicle in a case where a predetermined operation is accepted by the inputter; and a mode controller that prohibits the autonomous driving mode from being started by the autonomous driving controller in a case where the host vehicle has reached a predetermined section including at least one of a divergence point, a merging point, and a destination.

An invention of a second aspect is the vehicle control system according to the first aspect, wherein the autonomous driving mode is a driving mode for leading the host vehicle to a set destination in accordance with a route to the destination, the divergence point is a divergence point at which a lane leading to the destination in the route diverges from a main line, and the merging point is a merging point at which the lane leading to the destination in the route is set as the main line.

An invention of a third aspect is the vehicle control system according to the first aspect, wherein the autonomous driving mode is a driving mode for causing the host vehicle to travel along a host lane in which the host vehicle is present, the merging point is a merging point at which the host lane merges into a main line, and the mode controller prohibits the autonomous driving mode from being started by the autonomous driving controller in a case where the host vehicle has reached a predetermined section including at least the merging point.

An invention of a fourth aspect is the vehicle control system according to any one of the first aspect to the third aspect further including a recognizer that recognizes a nearby vehicle that is present in the vicinity of the host vehicle, wherein, in a case where a merging vehicle that is present in a merging lane merging into a main line is not recognized by the recognizer at a merging point at which a host lane in which the host vehicle is present is set as the main line, the mode controller permits the autonomous driving mode to be started by the autonomous driving controller.

An invention of a fifth aspect is the vehicle control system according to the fourth aspect, wherein, in a case where the merging vehicle is recognized by the recognizer at the merging point at which the host lane is set as the main line, the mode controller prohibits the autonomous driving mode from being started by the autonomous driving controller on the basis of a relative relationship between the host vehicle and the merging vehicle.

An invention of a sixth aspect is the vehicle control system according to the fifth aspect, wherein, in a case where a time obtained by dividing a relative distance between the host vehicle and the merging vehicle by a relative speed between the host vehicle and the merging vehicle is less than a threshold, the mode controller prohibits the autonomous driving mode from being started by the autonomous driving controller.

An invention of a seventh aspect is the vehicle control system according to any one of the first aspect to the sixth aspect, wherein, in a case where the autonomous driving mode is prohibited from being executed by the autonomous driving controller and then a predetermined operation is accepted by the inputter, the mode controller permits the autonomous driving mode to be started by the autonomous driving controller at a timing when the host vehicle withdraws from the predetermined section.

An invention of an eighth aspect is the vehicle control system according to the seventh aspect, wherein, in a case where the host vehicle does not withdraw from the predetermined section until a predetermined time elapses after the predetermined operation is accepted by the inputter, the mode controller prohibits the autonomous driving mode from being started by the autonomous driving controller.

An invention of a ninth aspect is the vehicle control system according to any one of the first aspect to the eighth aspect, further including an outputter that outputs information, wherein, in a case where the autonomous driving mode is permitted to be started by the autonomous driving controller, the mode controller causes the outputter to output information indicating that the execution of the autonomous driving mode is permitted.

An invention of a tenth aspect is the vehicle control system according to any one of the first aspect to the ninth aspect, further including an outputter that outputs information, wherein, in a case where the autonomous driving mode is permitted to be started by the autonomous driving controller, the mode controller causes the outputter to output information relating to time or distance required until the host vehicle reaches the predetermined section.

An invention of an eleventh aspect is the vehicle control system according to any one of the first aspect to the ninth aspect, further including an outputter that outputs information, wherein, in a case where the autonomous driving mode is prohibited from being started by the autonomous driving controller, the mode controller causes the outputter to output information relating to time or distance required until the host vehicle passes through the predetermined section.

According to an invention of a twelfth aspect, a vehicle control method is provided, including causing an on-board computer to: accept an occupant's operation of a host vehicle; execute an autonomous driving mode for controlling steering and acceleration/deceleration of the host vehicle in a case where a predetermined operation is accepted; and prohibit the autonomous driving mode from being started in a case where the host vehicle has reached a predetermined section including at least one of a divergence point, a merging point, and a destination.

According to an invention of a thirteenth aspect, a computer-readable non-transitory storage medium storing a vehicle control program is provided causing an on-board computer to: accept an occupant's operation of a host vehicle; execute an autonomous driving mode for controlling steering and acceleration/deceleration of the host vehicle in a case where a predetermined operation is accepted; and prohibit the autonomous driving mode from being started in a case where the host vehicle has reached a predetermined section including at least one of a divergence point, a merging point, and a destination.

Advantageous Effects of Invention

According to the invention of each aspect, since the autonomous driving mode is prohibited to be started in a case where the host vehicle has reached a predetermined section including at least one of a divergence point, a merging point, and a destination, it is possible to determine the start of autonomous driving more appropriately.

DESCRIPTION OF EMBODIMENTS

Hereinafter, embodiments of a vehicle control system, a vehicle control method, and a vehicle control program of the present invention will be described with reference to the accompanying drawings.

First Embodiment

Figure 1:
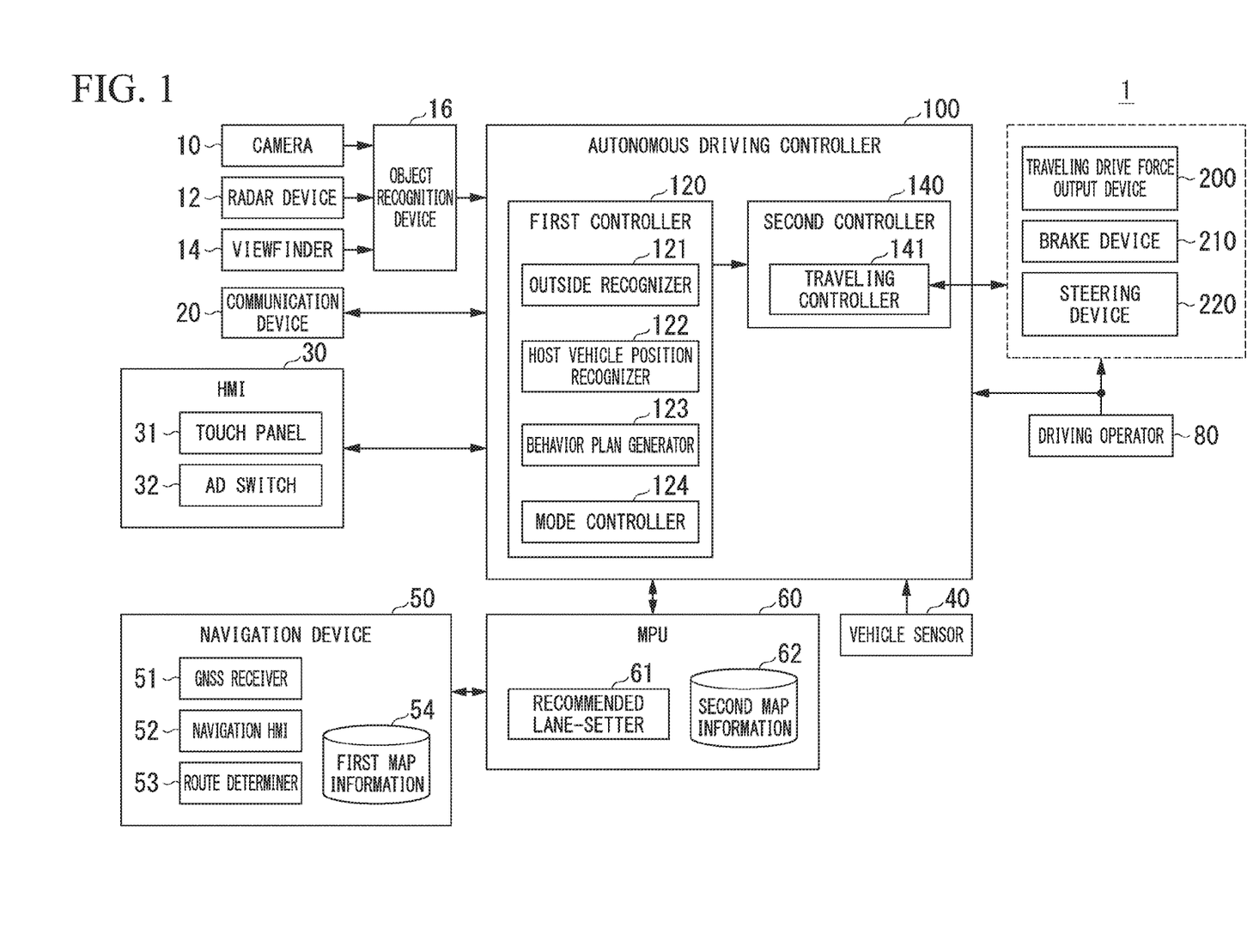
FIG. 1 is a configuration diagram of a vehicle control system 1 in a first embodiment.

FIG. 1 is a configuration diagram of a vehicle control system 1 in a first embodiment. A vehicle having the vehicle control system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle control system 1 includes, for example, a camera 10, a radar device 12, a viewfinder 14, an object recognition device 16, a communication device 20, a human machine interface (HMI) 30, a vehicle sensor 40, a navigation device 50, a micro-processing unit (MPU) 60, a driving operator 80, an autonomous driving controller 100, a traveling drive force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and portions of the configuration may be omitted, or other configurations may be further added thereto.

The camera 10 is a digital camera using a solid-state imaging element such as, for example, a charge-coupled device (CCD) or a complementary metal-oxide-semiconductor (CMOS). One or a plurality of cameras 10 are installed at any points on a vehicle having the vehicle control system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeterwaves to the vicinity of the host vehicle M, and detects radio waves (reflected waves) reflected from an object to detect at least the position (distance and orientation) of the object. One or a plurality of radar devices 12 are installed at any points of the host vehicle M. The radar device 12 may detect the position and speed of an object with a frequency modulated continuous wave (FMCW) system.

The viewfinder 14 is a light detection and ranging or laser imaging detection and ranging (LIDAR) finder that measures scattered light with respect to irradiation light and detects a distance to an object. One or a plurality of viewfinders 14 are installed at any points of the host vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition results to the autonomous driving controller 100.

The communication device 20 communicates with another vehicle in the vicinity of the host vehicle M (an example of a nearby vehicle) using, for example, a cellular network, a Wi-Fi network, Bluetooth (registered trademark), dedicated short-range communication (DSRC), or the like, or communicates with various server devices through a wireless base station.

The HMI 30 presents various types of information to an occupant of the host vehicle M, and accepts the occupant's input operation. For example, the HMI 30 includes a touch panel 31 and an auto-drive (AD) switch 32. The HMI 30 is an example of an "outputter." In addition, the HMI 30 is an example of an "inputter."

The touch panel 31 has, for example, a liquid crystal display (LCD), an organic electroluminescence (EL) display, or the like, and accepts an operation which is input by an occupant. For example, the touch panel 31 is installed at each unit of an instrument panel or any point of a passenger seat or a back seat. The touch panel 31 generates an operation input signal based on an accepted input operation, and outputs this signal to the autonomous driving controller 100.

The AD switch 32 is, for example, a switch that accepts an operation for starting an autonomous driving mode (an example of a predetermined operation) to be described later. For example, the AD switch 32 is provided in the vicinity of a steering wheel, or is provided at each unit of an instrument panel similarly to the touch panel 31. Meanwhile, the AD switch 32 may be an input key or the like. The AD switch 32 generates an operation input signal based on an accepted input operation, and outputs this signal to the autonomous driving controller 100.

In addition, the HMI 30 may include a speaker, a lamp or the like in addition to the touch panel 31 and the AD switch 32.

The vehicle sensor 40 includes a vehicle speed sensor that detects the speed of the host vehicle M, an acceleration sensor that detects acceleration, a yaw rate sensor that detects angular velocity around a vertical axis, an orientation sensor that detects the direction of the host vehicle M, or the like. The vehicle sensor 40 outputs detected information (such as speed, acceleration, angular velocity, or orientation) to the autonomous driving controller 100.

The navigation device 50 includes, for example, a global navigation satellite system (GNSS) receiver 51, a navigation HMI 52, and a route determiner 53, and has first map information 54 held in a storage device such as a hard disk drive (HDD) or a flash memory.

The GNSS receiver 51 specifies the position (absolute position) of the host vehicle M on the basis of signals received from GNSS satellites. The position of the host vehicle M may be specified or complemented by an inertial navigation system (INS) using an output of the vehicle sensor 40.

The navigation HMI 52 includes a display, a speaker, a touch panel, an input key, or the like. A portion or the entirety of the navigation HMI 52 may be shared with the above-described HMI 30.

The route determiner 53 refers to the first map information 54 to determine a route to a destination which is input by an occupant using the navigation HMI 52, for example, from the position of the host vehicle M specified by the GNSS receiver 51 (or any input position). The first map information 54 is, for example, information in which a road shape is represented by a link indicating a road and nodes connected by the link. The first map information 54 may include the curvature of a road, point-of-interest (POI) information, or the like. The route determined by the route determiner 53 is output to the MPU 60.

In addition, the navigation device 50 may perform route guidance using the navigation HMI 52 on the basis of the route determined by the route determiner 53. Meanwhile, the navigation device 50 may be realized by the function of a terminal device such as, for example, a smartphone or a tablet terminal possessed by a user. In addition, the navigation device 50 may transmit a current position and a destination to a navigation server through the communication device 20, and acquire a route sent back from the navigation server.

The MPU 60 functions as, for example, a recommended lane-setter 61, and holds second map information 62 in a storage device such as an HDD or a flash memory. The recommended lane-setter 61 divides a route provided from the navigation device 50 into a plurality of blocks (for example, divides a route every 100 [m] in a vehicle traveling direction), and refers to the second map information 62 to set a recommended lane in which the host vehicle M will travel for each block.

For example, in a case where a route provided from the navigation device 50 has a plurality of lanes, the recommended lane-setter 61 sets any one lane in each block as a recommended lane from one or more lanes included in each block. In a case where a divergence point, a merging point or the like is present in the provided route, the recommended lane-setter 61 sets a recommended lane so that the host vehicle M can travel on a reasonable travel route for proceeding to a destination at that point. For example, in a case where a destination is present on the extension line of a lane having diverged from a main line including a plurality of lanes, the recommended lane-setter 61 sets a lane toward a lane (divergence lane) which is a divergence destination among lanes included in the main line as a recommended lane. In this case, the recommended lane is set to a lane along a divergence lane (a lane connected to a divergence lane) among a plurality of lanes included in the main line at a predetermined distance in front of a divergence point. The predetermined distance is set to, for example, a distance sufficient to be able to perform a lane change to a divergence point in good time (for example, approximately 2 [km]). In the following description, a section from a point a predetermined distance ahead to a divergence point is referred to as a predetermined section.

In addition, the predetermined section is not limited to the section from a point a predetermined distance ahead to a divergence point, and may be a section from a point a predetermined distance ahead to a merging point or a destination. Meanwhile, these predetermined sections may be set as sections in which the host vehicle M proceeds in a case where the vehicle travels for a predetermined time.

The second map information 62 is map information higher in accuracy than the first map information 54. The second map information 62 includes, for example, information of the center of a lane, information of the boundary of a lane, or the like. In addition, the second map information 62 may contain road information, traffic regulation information, address information (an address or a postal code), facility information, telephone number information, or the like. The road information contains information indicating the type of road such as an expressway, a toll road, a national road, or a prefectural road, or information such as the number of lanes of a road, the width of each lane, the gradient of a road, the position (three-dimensional coordinates including longitude, latitude, and altitude) of a road, the curvature of a lane curve, the position of a merging and divergence point of a lane, or a mark provided on a road. The second map information 62 may be updated at any time by accessing another device using the communication device 20.

The driving operator 80 includes, for example, an accelerator pedal, a brake pedal, a shift lever, a steering wheel, and the like. A sensor that detects the amount of operation or the presence or absence of the operation is installed at the driving operator 80, and the detection result is output to one or both of the autonomous driving controller 100, or the traveling drive force output device 200, the brake device 210, and the steering device 220.

The autonomous driving controller 100 includes, for example, a first controller 120 and a second controller 140. The first controller 120 and the second controller 140 are each realized by a processor such as a central processing unit (CPU) executing programs (software). In addition, some or all of components of the first controller 120 and the second controller 140 may be realized by hardware such as a large-scale integration (LSI), an application-specific integrated circuit (ASIC), or a field-programmable gate array (FPGA), or may be realized by software and hardware in cooperation.

The first controller 120 includes, for example, an outside recognizer 121, a host vehicle position recognizer 122, a behavior plan generator 123, and a mode controller 124. The outside recognizer 121 is an example of a "recognizer."

The outside recognizer 121 recognizes states such as the position, speed, and acceleration of a nearby vehicle on the basis of information which is input from the camera 10, the radar device 12, and the viewfinder 14 through the object recognition device 16. The nearby vehicle is, for example, a vehicle that travels the vicinity of the host vehicle M, and is a vehicle that travels in the same direction as the host vehicle M. The nearby vehicle is, for example, a preceding vehicle that travels immediately in front of the host vehicle M. This preceding vehicle may be a vehicle that is stopped in front of the host vehicle M in a host lane. The position of the nearby vehicle may be represented by a representative point such as the centroid or corner of the nearby vehicle, or may be represented by a region which is represented by the contour of the nearby vehicle. The "state" of the nearby vehicle may include the acceleration, jerk, or "behavior state" (such as, for example, whether it is performing or attempting to perform a lane change) of the nearby vehicle. In addition, the outside recognizer 142 may recognize the positions of a fallen object or a guardrail on a roadway, a telephone pole, a parked vehicle, a pedestrian, a sign on a road surface, a mark, or other objects in addition to the nearby vehicle.

The host vehicle position recognizer 122 recognizes, for example, a lane in which the host vehicle M travels (host lane), and the relative position and posture of the host vehicle M with respect to the host lane. The host vehicle position recognizer 122 recognizes the host lane, for example, by comparing the pattern (for example, an array of a solid line and a broken line) of a road division line which is obtained from the second map information 62 with the pattern of the road division line in the vicinity of the host vehicle M which is recognized from an image captured by the camera 10. In this recognition, the position of the host vehicle M which is acquired from the navigation device 50 or a processing result based on an INS may be added.

Figure 2:
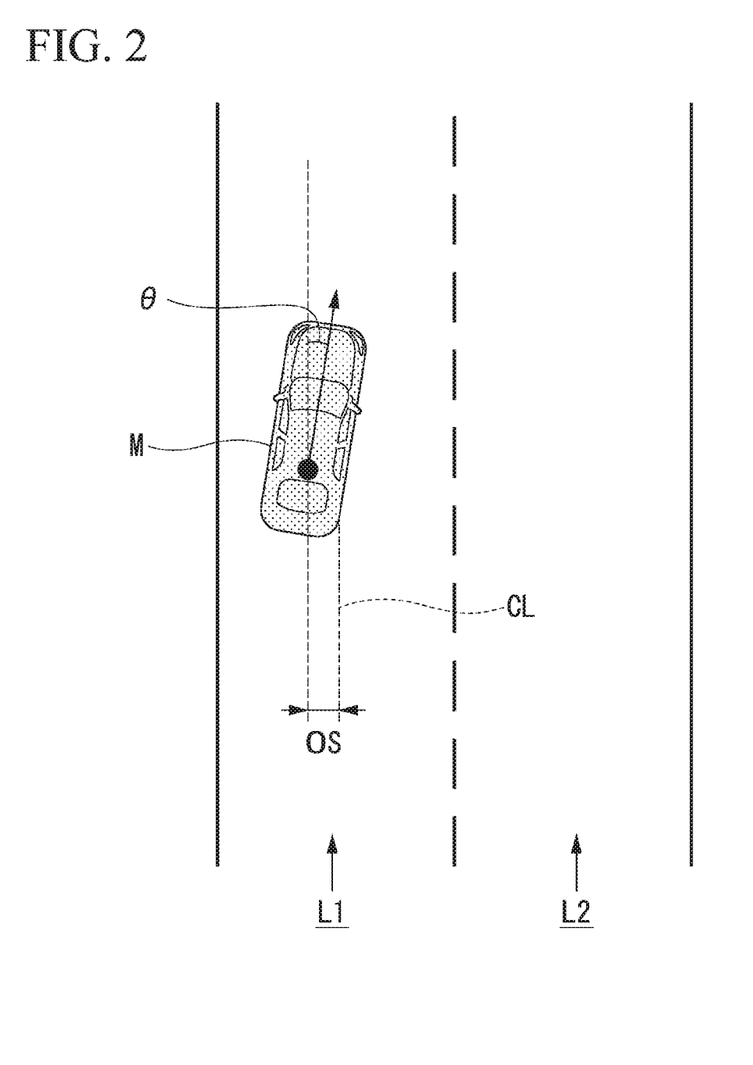
FIG. 2 is a diagram illustrating a state in which the relative position and posture of a host vehicle M with respect to a host lane L1 are recognized by a host vehicle position recognizer 122.

The host vehicle position recognizer 122 recognizes, for example, the position or posture of the host vehicle M with respect to the host lane. FIG. 2 is a diagram illustrating a state in which the relative position and posture of the host vehicle M with respect to the host lane L1 are recognized by the host vehicle position recognizer 122. The host vehicle position recognizer 122 recognizes, for example, an angle θ to a line that links deviation OS of a reference point (for example, centroid) of the host vehicle M from a host lane center CL to the host lane center CL in the traveling direction of the host vehicle M as the relative position and posture of the host vehicle M with respect to the host lane L1. Meanwhile, instead, the host vehicle position recognizer 122 may recognize the position of the reference point of the host vehicle M or the like with respect to either side end portion of the host lane L1 as the relative position of the host vehicle M with respect to the host lane. The relative position of the host vehicle M which is recognized by the host vehicle position recognizer 122 is provided to the behavior plan generator 123 and the mode controller 124.

The behavior plan generator 123 generates a behavior plan so as to travel in a lane which is set as a recommended lane by the recommended lane-setter 61 and to be capable of coping with the surrounding situation of the host vehicle M. The behavior plan is constituted by events which are sequentially executed under an autonomous driving mode. The autonomous driving mode involves the autonomous driving controller 100 controlling the acceleration/deceleration and steering of the host vehicle M. For example, the autonomous driving mode is a mode in which the host vehicle M is led to a destination in accordance with a route having a recommended lane determined thereon by controlling the acceleration/deceleration and steering of the host vehicle M.

Examples of the events include a constant speed traveling event of traveling in the same traveling lane at a constant speed, a following traveling event of following a preceding vehicle, a lane-change event of changing a traveling lane, a passing event of passing a preceding vehicle, and the like. The passing event is planned, for example, in a situation in which the speed of a preceding vehicle is slower than the speed of the host vehicle M by a constant speed or more, and the average speed or the like of a nearby vehicle traveling in an adjacent lane which is adjacent to the host lane is faster than the speed of the host vehicle M by a constant speed or more. For example, in a case where the passing event is executed, the host vehicle M moves temporarily to an adjacent lane through a lane change, and moves in front of a preceding vehicle through a lane change with acceleration or the like.

In addition, the events may include a merging event of accelerating/decelerating the host vehicle M in a merging lane for merging into the main line and changing a traveling lane to the merging lane, a divergence event of changing the lane of the host vehicle M to a divergence lane having diverged from the main line at a divergence point, an emergency stop event of urgently stopping the host vehicle M in accordance with the behavior of a nearby vehicle or the like, a switching event (overtaking event) of terminating the autonomous driving mode and switching the mode to a manual driving mode, and the like. The manual driving mode involves the traveling drive force output device 200, the brake device 210, and the steering device 220 being controlled by an occupant's operation of the driving operator 80. In addition, during execution of these events, an event for avoidance may be planned on the basis of the surrounding situation (such as the presence of an obstacle on a roadway, a nearby vehicle or a pedestrian, or lane narrowing caused by road construction) of the host vehicle M.

The behavior plan generator 123 generates a target trajectory along which the host vehicle M will travel in the future. The target trajectory is represented as points (trajectory points), lined up in order, to be reached by the host vehicle M. The trajectory point is a point to be reached by the host vehicle M for each predetermined traveling distance, and aside from this, target speed and target acceleration for each predetermined sampling time (for example, approximately several tenths [sec]) are generated as a portion of the target trajectory. In addition, the trajectory point may be a position, for each predetermined sampling time, to be reached by the host vehicle M at the sampling time. In this case, information of the target speed or the target acceleration is represented by an interval between trajectory points.

Figure 3:
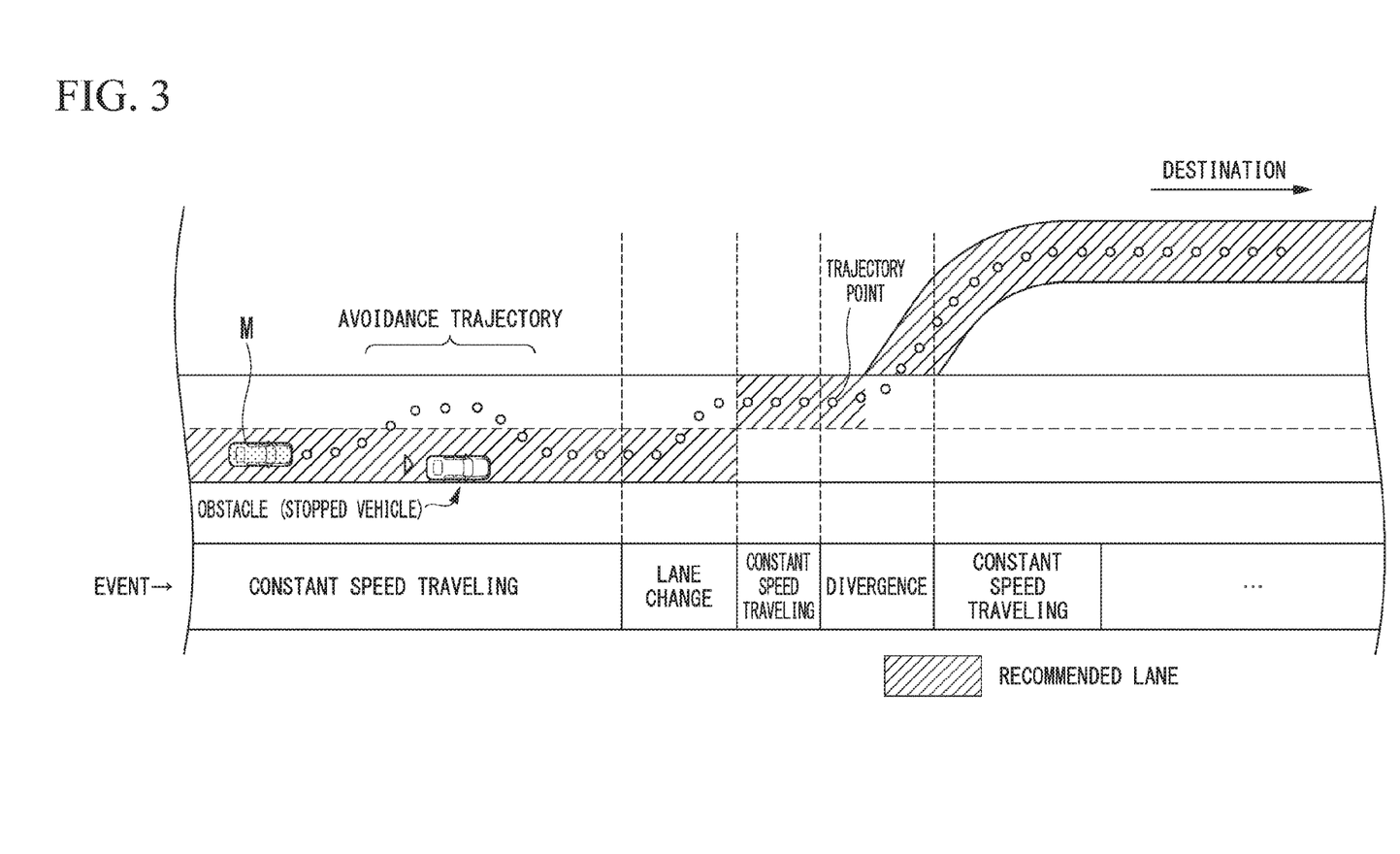
FIG. 3 is a diagram illustrating a state in which a target trajectory is generated on the basis of a recommended lane.

FIG. 3 is a diagram illustrating a state in which a target trajectory is generated on the basis of a recommended lane. As shown in the drawing, the recommended lane is set to be advantageous to travel along a route to a destination. In a case where a vehicle arrives at a predetermined distance in front of a switching point of a recommended lane, the behavior plan generator 123 starts the lane-change event, the divergence event, the merging event, or the like. The predetermined distance from a switching point of a recommended lane may be decided depending on the type of event. In a case where it is necessary to avoid an obstacle during execution (start) of each event, the behavior plan generator 123 may generate a trajectory for avoidance as shown in the drawing, or may generate a trajectory for deceleration of stopping the host vehicle M in front of the obstacle.

The behavior plan generator 123 generates, for example, candidates for a plurality of target trajectories, and selects an optimum target trajectory at that point in time on the basis of the viewpoint of safety and efficiency.

In addition, the behavior plan generator 123 does not generate a behavior plan and a target trajectory under the manual driving mode.

For example, in a case where the host vehicle M has reached a predetermined section including any of a divergence point at which the host lane diverges from the main line, a merging point at which the host lane merges into the main line, and a destination, the mode controller 124 prohibits the autonomous driving mode from being started by the behavior plan generator 123.

For example, in a case where the autonomous driving mode is prohibited from being executed by the behavior plan generator 123, the mode controller 124 invalidates the start operation of the autonomous driving mode accepted by the touch panel 31 or the AD switch 32. For example, the mode controller 124 may invalidate the operations of the touch panel 31 and the AD switch 32 by prohibiting an operation input signal from being acquired from the touch panel 31 and the AD switch 32, and may invalidate the operations of the touch panel 31 and the AD switch 32 by discarding (erasing) the operation input signal acquired from the touch panel 31 and the AD switch 32.

In addition, in a case where the host vehicle M has reached a predetermined section including any of a divergence point, a merging point, and a destination, and the autonomous driving mode is already executed by the behavior plan generator 123, the mode controller 124 may continue the autonomous driving mode.

Figure 4:
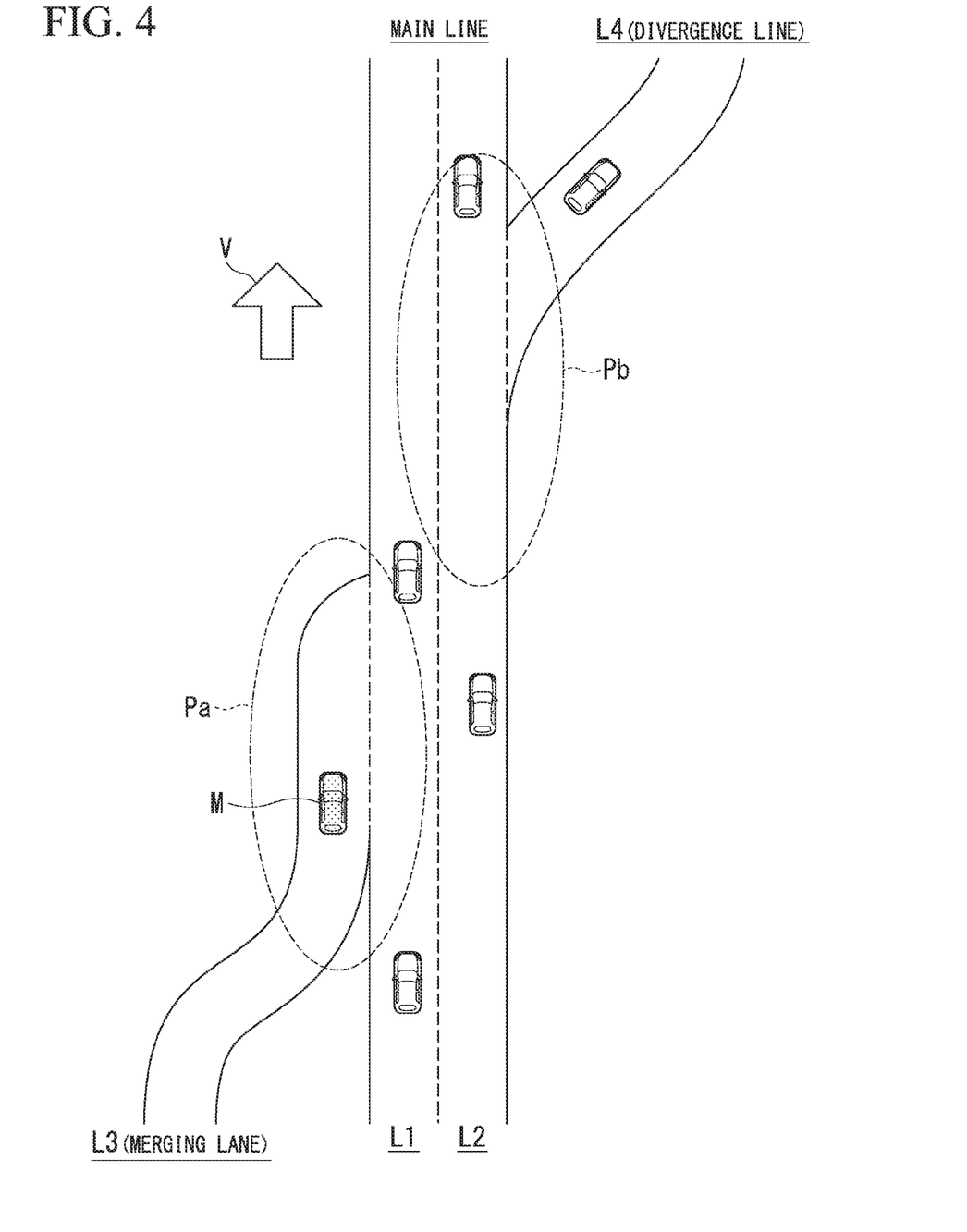
FIG. 4 is a diagram illustrating an example of a situation in which an autonomous driving mode is prohibited from being executed.

FIG. 4 is a diagram illustrating an example of a situation in which the autonomous driving mode is prohibited from being executed. In the drawing, Pa represents a predetermined section including a merging point, Pb represents a predetermined section including a divergence point, and an arrow V represents the traveling direction of the host vehicle M and nearby vehicles.

For example, in a case where the host vehicle M has reached the predetermined section Pa in a situation in which the host vehicle M travels in a merging lane L3 merging into the lane L1 of the main line, the mode controller 124 prohibits the autonomous driving mode from being started by the behavior plan generator 123.

In addition, in a case where the host vehicle M has reached the predetermined section Pb in a situation in which the host vehicle M traveling in a lane L2 of the main line diverges to a divergence lane L4, the mode controller 124 prohibits the autonomous driving mode from being started by the behavior plan generator 123.

In the autonomous driving mode, since the merging event or the divergence event is greater the number of nearby vehicles to be monitored or is more complicated in target trajectory than the constant speed traveling event or the following traveling event, the degree of difficulty of autonomous driving is likely to become higher. It is assumed that, during such an event having a high degree of difficulty of autonomous driving, an occupant having driven the host vehicle M under the manual driving mode hands over the right to operate the host vehicle M to the vehicle side by operating the AD switch 32 or the like. In this case, when an inter-vehicle distance from a nearby vehicle is not sufficient, the remaining merging road is short and sufficient acceleration is not possible, or a time required for recognizing a nearby vehicle is not secured, various conditions required for smoothly performing autonomous driving may not be satisfied. As a result, there is a concern that control based on autonomous driving is difficult, switching (overtaking) from the autonomous driving mode to the manual driving mode is performed, or a forceful lane change or the like is performed without consideration for a nearby vehicle.

On the other hand, in the present embodiment, the start of autonomous driving can be determined more appropriately by prohibiting the autonomous driving mode from being executed by the behavior plan generator 123 in the vicinity of a point at which an event having a high degree of difficulty of autonomous driving is assumed to be executed, or in the vicinity of a destination at which the execution time of the autonomous driving mode is short even when the autonomous driving mode is started.

The second controller 140 includes a traveling controller 141. The traveling controller 141 controls the traveling drive force output device 200, the brake device 210, and the steering device 220 so that the host vehicle M passes through the target trajectory generated by the behavior plan generator 123 on schedule. The behavior plan generator 123 and the traveling controller 141 are an example of the "autonomous driving controller."

The traveling drive force output device 200 outputs a drive force (torque) for a vehicle to travel to a drive wheel. The traveling drive force output device 200 includes, for example, a combination of an internal-combustion engine, an electric motor, a transmission and the like and an ECU that controls these components. The ECU controls the above components in accordance with information which is input from the traveling controller 141 under the autonomous driving mode. In addition, the ECU controls the above components in accordance with information which is input from the driving operator 80 under the manual driving mode.

The brake device 210 includes, for example, a brake caliper, a cylinder that transfers hydraulic pressure to the brake caliper, an electric motor that generates hydraulic pressure to the cylinder, and a brake ECU. The brake ECU controls the electric motor in accordance with the information which is input from the traveling controller 141, and allows a brake torque according to a braking operation to be output to each wheel. The brake device 210 may include, as a backup, a mechanism that transfers hydraulic pressure generated by the operation of the brake pedal included in the driving operator 80 to the cylinder through a master cylinder. Meanwhile, the brake device 210 is not limited to the above-described configuration, and may be an electronic control type hydraulic brake device that controls an actuator in accordance with the information which is input from the traveling controller 141 and transfers the hydraulic pressure of the master cylinder to the cylinder.

The steering device 220 includes, for example, a steering ECU and an electric motor. The electric motor changes the direction of a turning wheel by causing a force to act on, for example, a rack-and-pinion mechanism. The steering ECU drives the electric motor in accordance with the information which is input from the traveling controller 141 under the autonomous driving mode, and drives the electric motor in accordance with the information which is input from the driving operator 80 under the manual driving mode, to thereby change the direction of the turning wheel.

Figure 5:
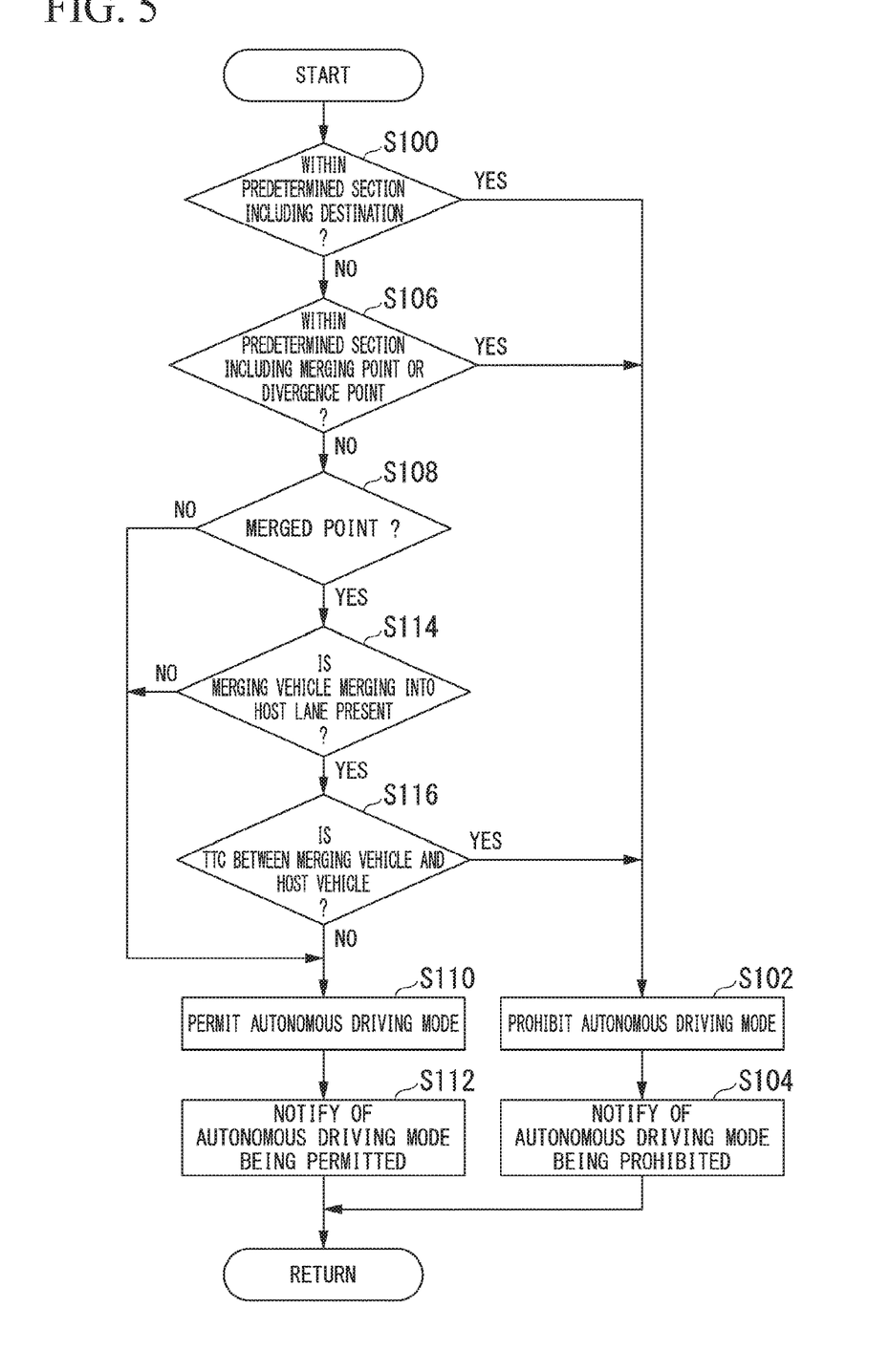
FIG. 5 is a flow chart illustrating an example of processes which are executed by a mode controller 124 in the first embodiment.

Hereinafter, a series of processes performed by the mode controller 124 will be described with reference to a flow chart. FIG. 5 is a flow chart illustrating an example of processes which are executed by the mode controller 124 in the first embodiment. The processes of the present flow chart are repeatedly performed, for example, with a predetermined period during the manual driving mode.

First, the mode controller 124 determines whether the host vehicle M has reached a predetermined section including a destination on the basis of the relative position of the host vehicle M which is recognized by the host vehicle position recognizer 122 and a route in which a recommended lane is set (step S100).

In a case where it is determined that the host vehicle M has reached the predetermined section including a destination, the mode controller 124 prohibits the autonomous driving mode from being started by the behavior plan generator 123 (step S102).

Next, the mode controller 124 causes the HMI 30 to output information indicating that the autonomous driving mode is prohibited from being executed, and notifies an occupant of this information (step S104). For example, the mode controller 124 causes the touch panel 31 to display an image indicating that the autonomous driving mode is prohibited from being executed (hereinafter, referred to as a mode prohibition notification image).

Figure 6:
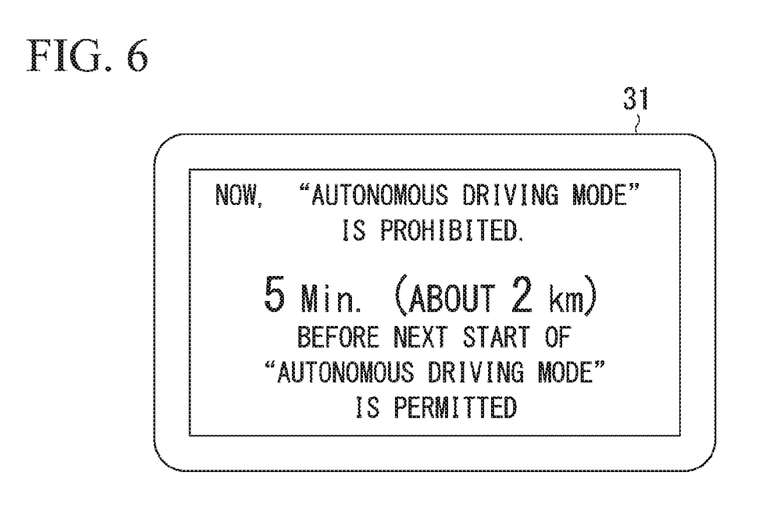
FIG. 6 is a diagram illustrating an example of a touch panel 31 on which a mode prohibition notification image is displayed.

FIG. 6 is a diagram illustrating an example of the touch panel 31 on which a mode prohibition notification image is displayed. For example, the mode controller 124 may cause the touch panel 31 to display that the autonomous driving mode is prohibited from being executed as characters or the like, and to display time or distance required until the autonomous driving mode is permitted to be started. For example, the mode controller 124 derives time or distance required for the host vehicle M to pass through a point, such as a divergence point or a merging point, having a high degree of difficulty of autonomous driving on the basis of the speed, acceleration or the like of the host vehicle M detected by the vehicle sensor 40. The mode controller 124 causes the touch panel 31 to display the derived time or distance as an image. Thereby, an occupant can recognize a timing at which the autonomous driving mode can be started.

In addition, the mode controller 124 may repeat derivation of time or distance required for passing through a point having a high degree of difficulty of autonomous driving for every predetermined period (for example, every advance to a predetermined distance, or every elapse of a predetermined time), and cause the touch panel 31 to sequentially display the derived time or distance. Thereby, an occupant can recognize the duration of manual driving that enables the start of autonomous driving in a count-down mode.

On the other hand, in a case where it is determined that the host vehicle M has not reached the predetermined section including a destination, the mode controller 124 determines whether the host vehicle M has reached a predetermined section including a merging point or a divergence point on the basis of the relative position of the host vehicle M which is recognized by the host vehicle position recognizer 122 and the route in which a recommended lane is set (step S106).

In a case where it is determined that the host vehicle M has reached the predetermined section including a merging point or a divergence point, the mode controller 124 advances the process to S102 described above.

On the other hand, in a case where it is determined that the host vehicle M has not reached the predetermined section including a merging point or a divergence point, the mode controller 124 determines whether the host vehicle M has reached a merged point on the basis of the relative position of the host vehicle M which is recognized by the host vehicle position recognizer 122 and the route in which a recommended lane is set (step S108). The merged point is a merging point at which a host lane in which the host vehicle M is present is set as a main line.

In a case where it is determined that the host vehicle M has not reached the merged point, the mode controller 124 advances the process to S110 to be described later.

On the other hand, in a case where it is determined that the host vehicle M has reached the merged point, the mode controller 124 determines whether a merging vehicle has been recognized by the outside recognizer 121 (step S114). The merging vehicle is a vehicle present in a merging lane that merges into the host lane (main line) at the merged point.

In a case where it is determined that the merging vehicle has not been recognized by the outside recognizer 121, the mode controller 124 advances the process to S110 to be described later.

On the other hand, in a case where it is determined that the merging vehicle has been recognized by the outside recognizer 121, the mode controller 124 determines whether a time-to-collision TTC between this merging vehicle and the host vehicle M is less than a threshold (step S116).

Figure 7:
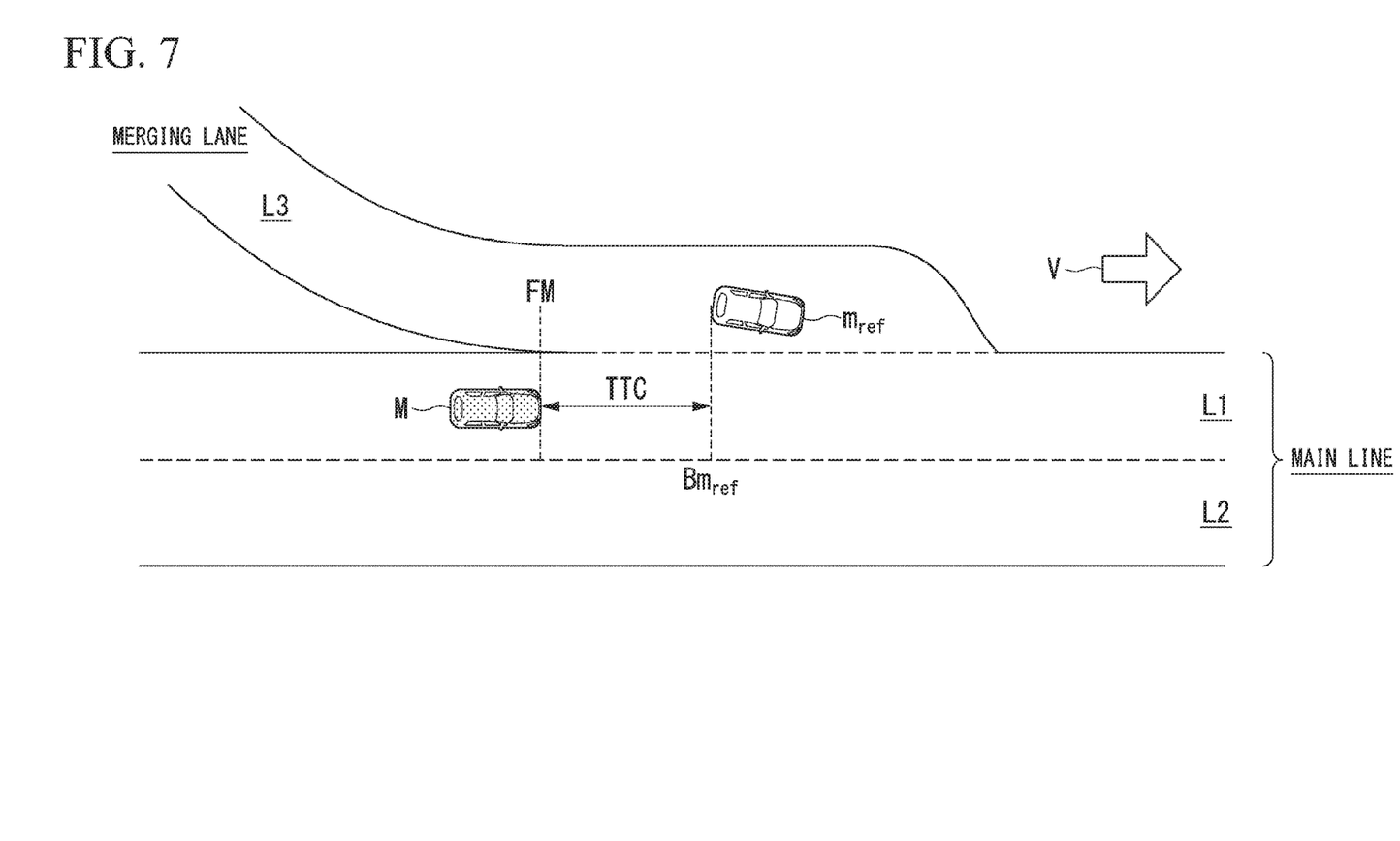
FIG. 7 is a diagram illustrating a time-to-collision TTC between a merging vehicle and the host vehicle M.

FIG. 7 is a diagram illustrating a time-to-collision TTC between a merging vehicle and the host vehicle M. In the drawing, $m_{ref}$ represents a merging vehicle present in the merging lane L3 merging into the host lane L1 in which the host vehicle M travels. For example, the mode controller 124 assumes an extended line FM obtained by virtually extending out the front end of the host vehicle M to the merging lane L3 side and an extended line $Bm_{ref}$ obtained by virtually extending out the rear end of the merging vehicle $m_{ref}$ to the host lane L1 side, and derives a time obtained by dividing a distance between (relative distance) between the extended line FM and the extended line $Bm_{ref}$ by a relative speed between the host vehicle M and the merging vehicle $m_{ref}$ as the time-to-collision TTC between the merging vehicle and the host vehicle M.

In a case where it is determined that the time-to-collision TTC is less than a threshold, that is, a case where a distance between the host vehicle M and the merging vehicle is not sufficiently secured, the mode controller 124 advances the process to S102 described above.

On the other hand, in a case where it is determined that the time-to-collision TTC is equal to or greater than the threshold, that is, a case where the distance between the host vehicle M and the merging vehicle is sufficiently secured, the mode controller 124 permits the autonomous driving mode to be started by the behavior plan generator 123 (step S110).

Next, the mode controller 124 causes the HMI 30 to output information indicating that the autonomous driving mode is permitted from being executed, and notifies an occupant of this information (step S112). For example, the mode controller 124 causes the touch panel 31 to display an image indicating that the autonomous driving mode is permitted to be executed (hereinafter, referred to as a mode permission notification image). Thereby, the process of the present flow chart is terminated.

Figure 8:
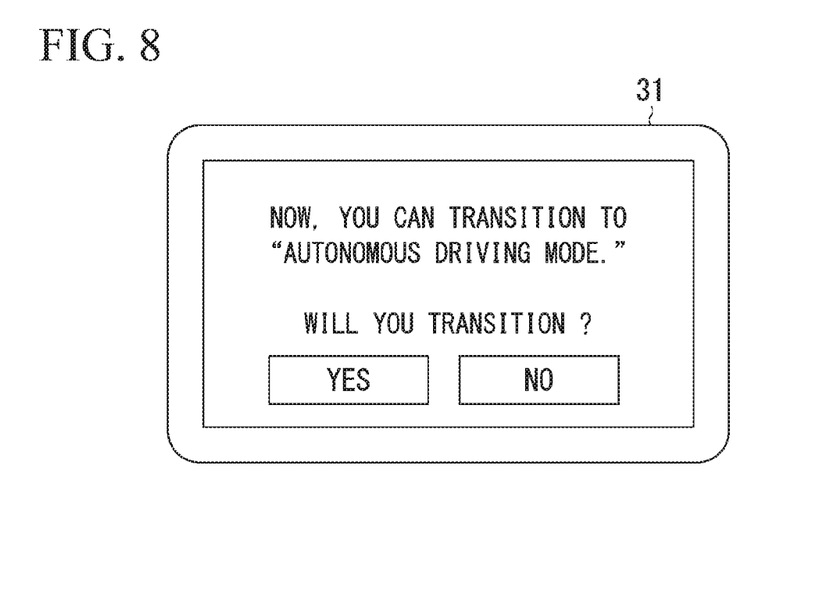
FIG. 8 is a diagram illustrating an example of the touch panel 31 on which a mode permission notification image is displayed.

FIG. 8 is a diagram illustrating an example of the touch panel 31 on which a mode permission notification image is displayed. For example, the mode controller 124 causes the touch panel 31 to display that the autonomous driving mode is permitted to be executed as an image. In this case, the mode controller 124 may cause the touch panel 31 to accept an operation of accepting the start of the autonomous driving mode (an operation of a region of YES in the drawing).

Figure 9:
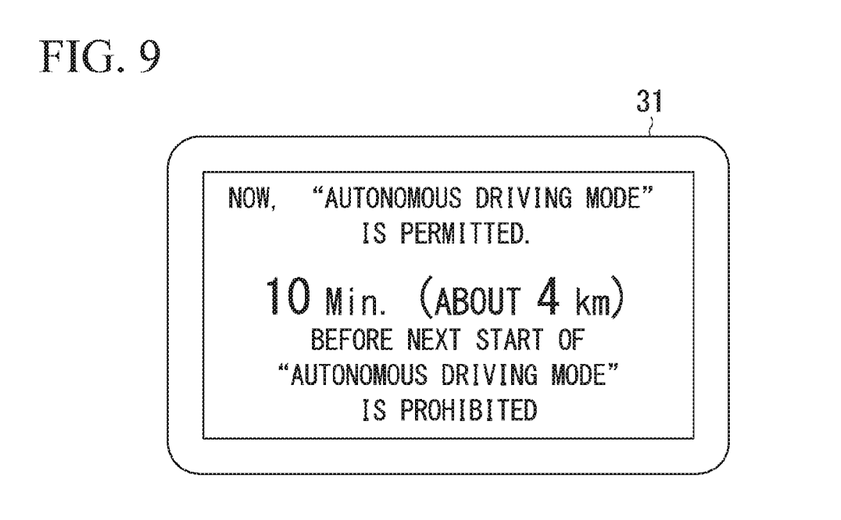
FIG. 9 is a diagram illustrating another example of the touch panel 31 on which a mode permission notification image is displayed.

FIG. 9 is a diagram illustrating another example of the touch panel 31 on which a mode permission notification image is displayed. As shown in the drawing, the mode controller 124 may cause the touch panel 31 to display that the autonomous driving mode is permitted to be executed as characters or the like, and to display time or distance required until the autonomous driving mode is prohibited from being started. In addition, the mode controller 124 may repeat derivation of time or distance required for reaching a point having a high degree of difficulty of autonomous driving, for example, for every predetermined period, and cause the touch panel 31 to sequentially display the derived time or distance. This enables an occupant to, for example, recognize that a return to autonomous driving is not possible after ten minutes in the case of switching to manual driving. In addition, the occupant can determine how many minutes the AD switch 32 has to be operated in for switching from the manual driving to autonomous driving.

According to the first embodiment described above, the start of autonomous driving can be determined more appropriately by including the touch panel 31 or the AD switch 32 that accepts an occupant's operation of the host vehicle M, the behavior plan generator 123 and the traveling controller 141 that execute the autonomous driving mode in a case where the start operation of the autonomous driving mode is accepted thereby, and the mode controller 124 that prohibits the autonomous driving mode from being started in a case where the host vehicle M has reached a predetermined section including at least one of a divergence point, a merging point, and a destination.

Second Embodiment

Hereinafter, a second embodiment will be described. The second embodiment is different from the first embodiment described above in that the start of the autonomous driving mode is reserved when the AD switch 32 or the like is operated in a state in which the autonomous driving mode is prohibited from being executed. Hereinafter, a description will be given with focus on differences from the first embodiment, and common functions and the like with respect to those in the first embodiment will not be described.

Figure 10:
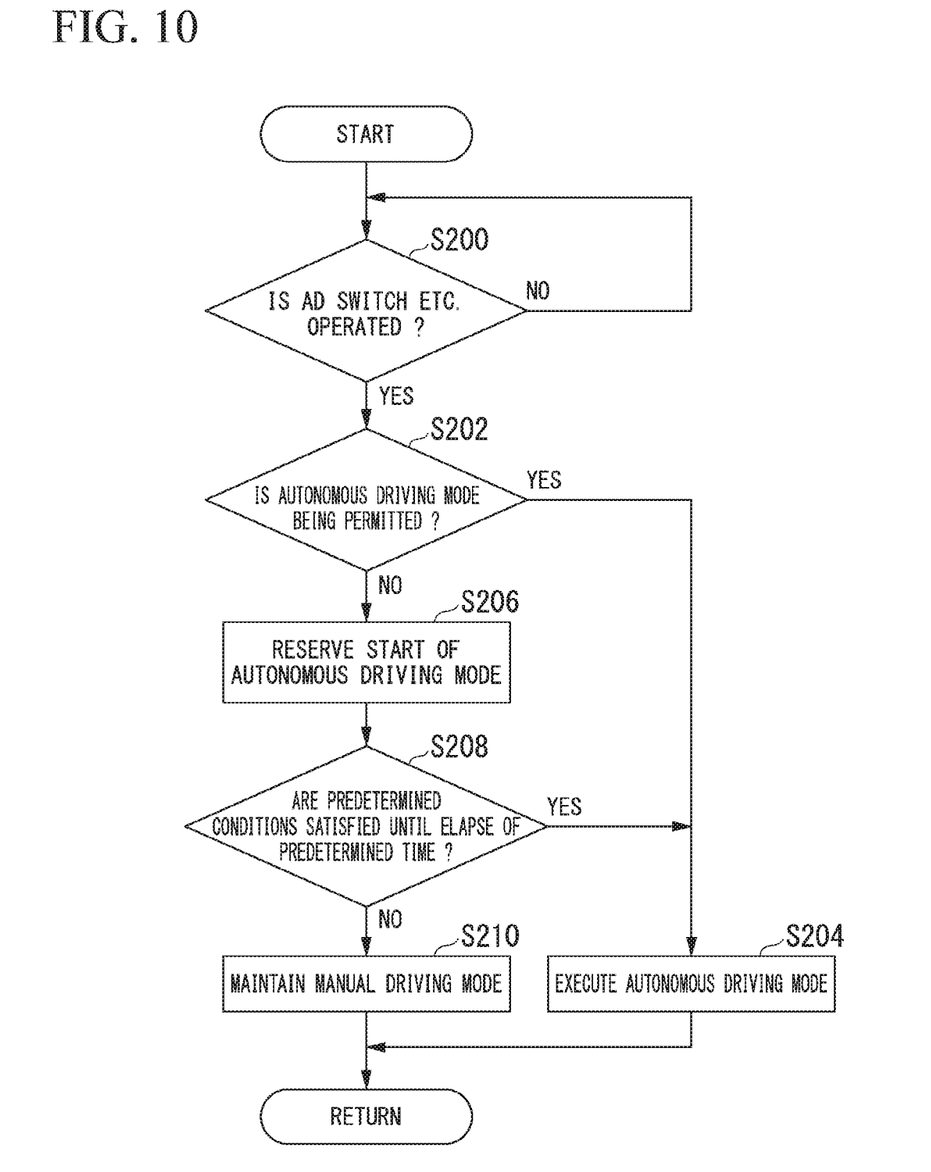
FIG. 10 is a flow chart illustrating an example of processes which are executed by a mode controller 124 in a second embodiment.

FIG. 10 is a flow chart illustrating an example of processes which are executed by a mode controller 124 in the second embodiment. The processes of the present flow chart are repeatedly performed, for example, with a predetermined period during the manual driving mode.

First, the mode controller 124 stands by until the AD switch 32 is operated (step S200). In addition, as shown in FIG. 8 described above, the mode controller 124 may stand by until an operation of starting the execution of the autonomous driving mode (a touch operation of a region of YES in the drawing) is performed on the touch panel 31.

In a case where the operation of starting the execution of the autonomous driving mode is performed on the AD switch 32 or the touch panel 31, the mode controller 124 determines whether the autonomous driving mode is being permitted to be executed (step S202).

In a case where the autonomous driving mode is permitted to be executed, the mode controller 124 causes the behavior plan generator 123 to execute the autonomous driving mode (step S204), and to generate a target trajectory based on each event.

On the other hand, in a case where the autonomous driving mode is not permitted to be executed, the mode controller 124 reserves the start of the autonomous driving mode (step S206). The reservation is that, for example, in a case where predetermined conditions are satisfied at a certain point in time in the future, the autonomous driving mode is started after the point in time on the basis of the start operation of the autonomous driving mode having been performed in the past. The predetermined conditions include the following conditions: (1) the position of the host vehicle M is out of a predetermined section including any of a divergence point, a merging point, and a destination, (2) a merging vehicle is not present at a merged point, and (3) a merging vehicle is present at a merged point, and a time-to-collision TTC between the merging vehicle and the host vehicle M is equal to or greater than a threshold.

Next, the mode controller 124 determines whether predetermined conditions have been satisfied until the elapse of a predetermined time (for example, approximately five 5 minutes) (step S208). In a case where the predetermined conditions have been satisfied until the elapse of the predetermined time, the mode controller 124 advances the process to S204 described above.

For example, in a case where the start operation of the autonomous driving mode is performed after the execution (start) of the autonomous driving mode is prohibited, and the start of the autonomous driving mode is reserved, and in a case where the host vehicle M withdraws within a predetermined time from a predetermined section including any of a divergence point, a merging point, and a destination, the mode controller 124 permits the autonomous driving mode to be started at the withdrawal timing.

On the other hand, in a case where the predetermined conditions are not satisfied until the elapse of the predetermined time, the mode controller 124 maintains the manual driving mode (step S210). For example, in a case where the host vehicle M is not able to withdraw within the predetermined time from the predetermined section including a divergence point, a merging point, and a destination, the mode controller 124 maintains the manual driving mode. In this case, the mode controller 124 may cause the touch panel 31 to display the mode prohibition notification image as shown in FIG. 6 described above.

According to the second embodiment described above, similarly to the first embodiment, it is possible to determine the start of autonomous driving more appropriately.

In addition, according to the second embodiment described above, in a case where the predetermined conditions are not satisfied until the predetermined time elapses after the operation of starting the execution of the autonomous driving mode is performed, switching to the autonomous driving mode is canceled, and thus it is possible to prevent switching to the autonomous driving mode from being performed, for example, at the time when an occupant forgets the reservation operation.

Meanwhile, in any of the above-described embodiments, a description has been given in which autonomous driving is executed in accordance with a route to a destination, but there is no limitation thereto. For example, the autonomous driving controller 100 may just perform autonomous driving along a road. For example, in a case where the AD switch 32 is operated (the start operation of the autonomous driving mode is performed) when the execution of the autonomous driving mode is permitted by the mode controller 124, the behavior plan generator 123 generates a target trajectory along the host lane recognized by the host vehicle position recognizer 122. Thereby, the traveling controller 141 causes the host vehicle M to travel along the host lane by controlling the traveling drive force output device 200, the brake device 210, and the steering device 220.

In this case, in a case where the position of the host vehicle M has reached a predetermined section including at least a merging point (a merging point at which the host lane merges into the main line), the mode controller 124 may prohibit the autonomous driving mode from being started by the behavior plan generator 123.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle control system
10 Camera
12 Radar device
14 Viewfinder
16 Object recognition device
20 Communication device
30 HMI
31 Touch panel
32 AD switch
40 Vehicle sensor
50 Navigation device
51 GNSS receiver
52 Navigation HMI
53 Route determiner
54 First map information
60 MPU
61 Recommended lane-setter
62 Second map information
80 Driving operator
100 Autonomous driving controller
120 First controller
121 Outside recognizer
122 Host vehicle position recognizer
123 Behavior plan generator
124 Mode controller
140 Second controller
141 Traveling controller
200 Traveling drive force output device
210 Brake device
220 Steering device

What is claim is:

1. A vehicle control system, comprising:
an inputter that accepts an occupant's operation of a host vehicle;
an autonomous driving controller that executes an autonomous driving mode for controlling steering and acceleration/deceleration of the host vehicle in a case where a predetermined operation is accepted by the inputter, the predetermined operation comprising allowing the autonomous driving mode; and
a mode controller that prohibits the autonomous driving mode from being started by the autonomous driving controller in a case where the host vehicle has reached a predetermined section including at least one of a divergence point, a merging point, and a destination,
wherein, in a case where the predetermined operation is accepted by the inputter during a first period, the first period comprising from when the autonomous driving mode is prohibited until the host vehicle withdraws from the predetermined section, the mode controller continues to prohibit the execution of the autonomous driving mode allowed by the predetermined operation accepted by the inputter in the first period until the host vehicle withdraws from the predetermined section,
wherein, in a case that, where the host vehicle withdraws from the predetermined section during a second period, the second period comprising from when the predetermined operation is accepted by the inputter until a predetermined time elapses, the mode controller permits the autonomous driving mode, allowed by the predetermined operation accepted in the first period, to be started by the autonomous driving controller after the host vehicle withdraws from the predetermined section, and
wherein, in a case where the host vehicle does not withdraw from the predetermined section during the second period, the mode controller prohibits the autonomous driving mode allowed by the predetermined operation accepted in the first period to be started by the autonomous driving controller after the host vehicle withdraws from the predetermined section.

2. The vehicle control system according to claim 1,
wherein the autonomous driving mode is a driving mode for leading the host vehicle to a set destination in accordance with a route to the set destination,
the divergence point is a divergence point at which a lane leading to the destination in the route diverges from a main line, and
the merging point is a merging point at which the lane leading to the destination in the route is set as the main line.

3. The vehicle control system according to claim 1,
wherein the autonomous driving mode is a driving mode for causing the host vehicle to travel along a host lane in which the host vehicle is present,
the merging point is a merging point at which the host lane merges into a main line, and
the mode controller prohibits the autonomous driving mode from being started by the autonomous driving controller in a case where the host vehicle has reached the predetermined section including at least the merging point.

4. The vehicle control system according to claim 1, further comprising a recognizer that recognizes a nearby vehicle that is present in the vicinity of the host vehicle, wherein, in a case where a merging vehicle that is present in a merging lane merging into a main line is not recognized by the recognizer at a merging point at which a host lane in which the host vehicle is present is set as the main line, the mode controller permits the autonomous driving mode to be started by the autonomous driving controller.

5. The vehicle control system according to claim 4, wherein, in a case where the merging vehicle is recognized by the recognizer at the merging point at which the host lane is set as the main line, the mode controller prohibits the autonomous driving mode from being started by the autonomous driving controller on the basis of a relative relationship between the host vehicle and the merging vehicle.

6. The vehicle control system according to claim 5, wherein, in a case where a time obtained by dividing a relative distance between the host vehicle and the merging vehicle by a relative speed between the host vehicle and the merging vehicle is less than a threshold, the mode controller prohibits the autonomous driving mode from being started by the autonomous driving controller.

7. The vehicle control system according to claim 1, further comprising an outputter that outputs information, wherein, in a case where the autonomous driving mode is permitted to be started by the autonomous driving controller, the mode controller causes the outputter to output information indicating that the execution of the autonomous driving mode is permitted.

8. The vehicle control system according to claim 1, further comprising an outputter that outputs information, wherein, in a case where the autonomous driving mode is permitted to be started by the autonomous driving controller, the mode controller causes the outputter to output information relating to time or distance required until the host vehicle reaches the predetermined section.

9. The vehicle control system according to claim 1, further comprising an outputter that outputs information, wherein, in a case where the autonomous driving mode is prohibited from being started by the autonomous driving controller, the mode controller causes the outputter to output information relating to time or distance required until the host vehicle passes through the predetermined section.

10. The vehicle control system according to claim 1, wherein the predetermined operation further comprises allowing the autonomous driving mode following a period of execution of a manual mode of the vehicle.

11. A vehicle control method comprising causing an on-board computer to:

accept an occupant's operation of a host vehicle;

execute an autonomous driving mode for controlling steering and acceleration/deceleration of the host vehicle in a case where a predetermined operation is accepted, the predetermined operation comprising allowing the autonomous driving mode; and prohibit the autonomous driving mode from being started in a case where the host vehicle has reached a predetermined section including at least one of a divergence point, a merging point, and a destination;

in a case where a predetermined operation is accepted during a first period, the first period comprising from when the autonomous driving mode is prohibited until the host vehicle withdraws from the predetermined section, continue to prohibit the execution of the autonomous driving mode, allowed by the predetermined operation accepted in the first period, until the host vehicle withdraws from the predetermined section;

in the case, where the host vehicle withdraws from the predetermined section during a second period, the second period comprising from when the predetermined operation accepted until a predetermined time elapses, permit the autonomous driving mode allowed by the predetermined operation accepted in the first period to be started after the host vehicle withdraws from the predetermined section; and in a case where the host vehicle does not withdraw from the predetermined section during the second period, a mode controller prohibits the autonomous driving mode allowed by the predetermined operation accepted in the first period to be started by the autonomous driving controller after the host vehicle withdraws from the predetermined section.

12. The vehicle control method according to claim 11, wherein the predetermined operation further comprises allowing the autonomous driving mode following a period of execution of a manual mode of the vehicle.

13. A computer-readable non-transitory storage medium storing a vehicle control program causing an on-board computer to:

accept an occupant's operation of a host vehicle;

execute an autonomous driving mode for controlling steering and acceleration/deceleration of the host vehicle in a case where a predetermined operation is accepted, the predetermined operation comprising allowing the autonomous driving mode; and prohibit the autonomous driving mode from being started in a case where the host vehicle has reached a predetermined section including at least one of a divergence point, a merging point, and a destination in a case where a predetermined operation is accepted during a first period, the first period comprising from when the autonomous driving mode is prohibited until the host vehicle withdraws from the predetermined section, continue to prohibit the execution of the autonomous driving mode, allowed by the predetermined operation accepted in the first period, until the host vehicle withdraws from the predetermined section;

in the case, where the host vehicle withdraws from the predetermined section during a second period, the second period comprising from when the predetermined operation accepted until a predetermined time elapses, permit the autonomous driving mode allowed by the predetermined operation accepted in the first period to be started after the host vehicle withdraws from the predetermined section; and in a case where the host vehicle does not withdraw from the predetermined section during the second period, a mode controller prohibits the autonomous driving mode allowed by the predetermined operation accepted in the first period to be started by the autonomous driving controller after the host vehicle withdraws from the predetermined section.

14. The computer-readable non-transitory storage medium according to claim 13, wherein the predetermined operation further comprises allowing the autonomous driving mode following a period of execution of a manual mode of the vehicle.

* * * * *